US008902737B2

(12) United States Patent
Ktenas et al.

(10) Patent No.: US 8,902,737 B2
(45) Date of Patent: Dec. 2, 2014

(54) COOPERATIVE NETWORK WITH ADAPTIVE FORWARDING REQUEST POLICY

(75) Inventors: Dimitri Ktenas, Fontaine (FR); Emilio Calvanese Strinati, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 654 days.

(21) Appl. No.: 13/101,407

(22) Filed: May 5, 2011

(65) Prior Publication Data

US 2011/0273981 A1 Nov. 10, 2011

(30) Foreign Application Priority Data

May 7, 2010 (FR) .................................... 10 53572

(51) Int. Cl.
| | |
|---|---|
| H04L 1/00 | (2006.01) |
| H04L 25/02 | (2006.01) |
| H04L 5/00 | (2006.01) |
| H04L 1/18 | (2006.01) |
| H04W 72/04 | (2009.01) |
| H04L 27/00 | (2006.01) |

(52) U.S. Cl.
CPC ............ *H04L 25/0232* (2013.01); *H04L 1/18* (2013.01); *H04W 72/04* (2013.01); *H04L 27/00* (2013.01); *H04L 1/1825* (2013.01); *H04L 1/1893* (2013.01); *H04L 5/0023* (2013.01); *H04L 5/006* (2013.01); *H04L 2001/0097* (2013.01)
USPC .......................................... 370/225; 370/226

(58) Field of Classification Search
CPC ......... H04L 1/18; H04L 1/1825; H04L 27/00; H04W 72/04

USPC ................................................... 370/225, 226
See application file for complete search history.

(56) References Cited

U.S. PATENT DOCUMENTS

| | | | |
|---|---|---|---|
| 7,502,412 B2* | 3/2009 | Chen .............................. | 375/229 |
| 2007/0086512 A1* | 4/2007 | Can et al. ...................... | 375/148 |
| 2008/0170512 A1* | 7/2008 | Hwang et al. ................. | 370/255 |
| 2008/0219222 A1* | 9/2008 | Lo et al. ........................ | 370/337 |
| 2009/0305711 A1* | 12/2009 | Rinne et al. .................... | 455/450 |

(Continued)

FOREIGN PATENT DOCUMENTS

| | | |
|---|---|---|
| EP | 2 151 940 A1 | 2/2010 |
| WO | WO 2008/153308 A1 | 12/2008 |
| WO | WO 2010/034339 A1 | 4/2010 |

OTHER PUBLICATIONS

European Search Report issued Aug. 29, 2011 in patent application No. EP 11 16 3924 with English Translation of Category of Cited Documents.

(Continued)

*Primary Examiner* — Farah Faroul
(74) *Attorney, Agent, or Firm* — Oblon, Spivak, McClelland, Maier & Neustadt, L.L.P.

(57) ABSTRACT

The invention relates to a packet forwarding method in a cooperative network implementing a source terminal, a destination terminal, and at least one relay terminal. In case of a packet decoding error in a node of the network, this method, depending on the outage state of a direct or relayed channel between two nodes of the network, enables a determination of the node(s) having to perform retransmission of the packet and if applicable, the transmission resource(s) to be used.

17 Claims, 9 Drawing Sheets

(56) References Cited

U.S. PATENT DOCUMENTS

| | | | |
|---|---|---|---|
| 2010/0128651 A1* | 5/2010 | Yim et al. | 370/315 |
| 2010/0265906 A1* | 10/2010 | Bucknell et al. | 370/329 |
| 2011/0093757 A1* | 4/2011 | Seol et al. | 714/749 |
| 2012/0008698 A1* | 1/2012 | Ktenas et al. | 375/259 |
| 2013/0005239 A1* | 1/2013 | Almgren et al. | 455/7 |
| 2014/0220994 A1 | 8/2014 | Calvanese et al. | |

OTHER PUBLICATIONS

Ender Ayanoglu, "Adaptive ARQ/FEC for Multitone Transmission in Wireless Networks", Global Telecommunications Conference, IEEE, XP010164657, 1995, pp. 2278-2283.

J. Nicholas Laneman, et al., "Exploiting Distributed Spatial Diversity in Wireless Networks", In Proc. Allerton Conf. Commun. Contr. Computing, Oct. 2000, pp. 1-10.

Ezio Biglieri, et al., "Fading Channels: Information-Theoretic and Communications Aspects", IEEE Transactions on Information Theory, vol. 44, No. 6, Oct. 1998, pp. 2619-2692.

Bin Zhao, et al., "Practical Relay Networks: A Generalization of Hybrid-ARQ", IEEE Journal on Selected Areas in Communications, vol. 23, No. 1, Jan. 2005, pp. 1-12.

* cited by examiner

COOPERATIVE NETWORK WITH ADAPTIVE FORWARDING REQUEST POLICY

TECHNICAL FIELD

This invention relates in general to cooperative communication systems. In particular, it is applicable to OFDMA-type (Orthogonal Frequency Division Multiple Access) systems, e.g. in WiMAX or 3GPP/LTE systems.

BACKGROUND OF THE INVENTION

Cooperative wireless communication systems are known to provide larger coverage and lesser sensitivity to fading than conventional cellular systems. A description of wireless systems of the cooperative type is for instance to be found in the article by J. N. Laneman and G. W. Wornell, entitled "Exploiting distributed spatial diversity in wireless networks", published October 2000 in Proc. Allerton Conf. on Comm., Contr. and Computing.

FIG. 1A schematically illustrates a first type of cooperation policy in such a system. The source terminal s transmits a data flow to a relay terminal r. The relay terminal receives the data flow and forwards it, possibly after decoding and recoding the same, to the destination terminal s. This policy enables the source terminal, e.g. a base station of a cellular network, to reach the terminal d when the path s-d is not line of sight (NLOS), because of the presence of an obstacle between s and d, or if the distance between s and d exceeds the range of the base station. The channel s-r-d resulting from concatenation of channels s-r and r-d is called relayed channel.

FIG. 1B schematically illustrates a second cooperation policy in such a system. The source terminal s transmits a data flow to a destination terminal d. The relay terminal r also receives the data flow from s and relays it to the destination terminal d. Thus, the destination terminal d receives a data flow via the direct channel s-d and via the relayed channel s-r-d. It may use the direct flow from s or the relayed flow from r, or even combine both of them to take advantage of diversity combining, as will be explained below.

Furthermore, the two cooperation policies set forth above can make use of a single relay or a plurality of relays. In the most general case, the cooperative network can be considered a graph having a source node (which is the source terminal), a destination node or sink (which is the destination terminal), and a plurality of intermediate nodes acting as relay terminals.

When a data flow is relayed in one or several times between a source terminal and a destination terminal, in other words, if there is a directed path in the graph between the source node and the destination node, going through at least one intermediate node, each component segment of this path is called a hop. Thus, in the simple case of FIG. 1A, the link between s and d is a so-called double hop link, and more generally speaking a multiple hop link. In the case of FIG. 2B, the presence both of a single hop link s-d and of a multiple hop link s-r-d is to be noted.

A multiple hop link makes use of a plurality of successive transmission channels. The resulting channel is then called a multiple hop channel. Thus, the relayed transmission channel s-r-d consisting of channels s-r and r-d is a 2 hop channel.

In any case, after amplification, a relay terminal may simply forward the signal it receives from the source terminal (so-called AF protocol, for Amplify and Forward) or else previously decode the signal received before forwarding (so-called DF protocol, for Decode and Forward) in a recoded form. When the code used for recoding is the same as the one used by the decoding, it is a DF protocol with constrained coding (or repetition code). Of course, in the opposite case, coding is said to be non-constrained.

In addition, OFDMA-type communication systems are well known in the state of the art, e.g. WiMax (802.16) or 3GP/LTE (3GPP Long Term Evolution) systems. In such a system, various users are assigned distinct subcarrier intervals (or frequency chunks) of an OFDM multiplex. The allocation of subcarrier intervals to a user is in general done dynamically for each transmission interval. Thus, from one transmission interval to the other, a base station transmitting data flows to several terminals may use a different allocation of subcarrier intervals for transmitting such flows. In a transmission interval, the emitter (e.g. a base station) transmits a sequence of OFDM symbols carrying the flow to the different users.

Use of a cooperative policy in an OFDMA network is also known in the state of the art. Thus, the standardization project IEEE 802.16j proposes to apply a cooperative policy to a cellular network of the WiMax type.

Different cooperative transmission protocols may be envisaged. For the sake of simplicity, the presentation thereof is limited to the simple case of a network comprising a source terminal, a relay terminal, and a destination terminal. All of these protocols share the implementation of two consecutive transmission intervals, a first interval during which the source terminal is transmitting and the relay terminal is receiving, and a second interval during which the relay terminal is forwarding and the destination terminal is receiving. However, they are different in that direct transmission between the source terminal and the destination terminal can take place either during the first transmission interval, or during the second one, or even during both of them.

FIGS. 2A to 2C illustrate three transmission protocols. Respectively, simple lines and double lines illustrate transmissions taking place during the first and second transmission intervals.

According to a first protocol, illustrated in FIG. 2A, the source terminal is transmitting to the relay and destination terminals during a first transmission interval, and the relay terminal is forwarding to the destination terminal during a second transmission interval.

According to a second protocol, illustrated in FIG. 2B, the source terminal is transmitting to the relay terminal during the first transmission interval. The source terminal is transmitting and the relay terminal is forwarding to the destination terminal during the second transmission interval.

Finally, according to a third protocol illustrated in FIG. 2C, the source terminal is transmitting to the relay and destination terminals during the first transmission interval. The source terminal is transmitting and the relay terminal is forwarding to the destination terminal during the second transmission interval.

The first protocol is said to be an orthogonal cooperation protocol, in as far as the signals received by the recipient are separated by distinct transmission intervals. More in general, if the destination terminal receives signals from a source and from one or several relays, by means of orthogonal resources (frequencies, subcarrier intervals, codes, transmission intervals), cooperation will still be orthogonal. The destination terminal may or may not combine the signals received and relayed on the orthogonal resources.

Herein, it is understood that a combination is either a simple average of the soft values of the data received on the two orthogonal resources (Diversity Combining) in case of a DF protocol with repetition code, or a code combining method, in case of a non-constrained DF protocol. Code combination may be a simple code concatenation (e.g. a code word transmitted on different resources), or use turbo decoding (the source and relay terminals acting as the elementary encoders of a space distributed turbo encoder).

Conversely, for the transmission protocols of FIGS. 2B and 2C, cooperation is said to be non-orthogonal if the same transmission resources, here the same transmission interval and, in an OFDMA system, the same subcarrier interval, are used by the relay and source terminals. Thus, the destination terminal receives, on the same transmission resource, the direct signal from the source terminal and the signal relayed by the relay terminal, in a combined form.

In addition, the forwarding request protocols ARQ (Automatic Repeat reQuest) and HARQ (Hybrid ARQ) are known in point-to-point telecommunication systems. In such a system, bit packets are encoded by an emitter by means of so-called FEC (Forward Error Correction) coding, which may adopt the form of an error detection code (CRC) or an error correction code (ECC), before being modulated and transmitted. If the receiver detects in a packet the presence of an error which it cannot correct, it will transmit a negative acknowledgement (NACK) to the emitter. The combination of FEC coding and of an ARQ forwarding protocol is known in literature by the acronym HARQ (Hybrid ARQ). Presently, there are several versions of the HARQ protocol.

In the simplest version, the so-called HARQ Type I, when an error cannot be corrected in a packet, a request for forwarding the incorrect packet is sent to the emitter and a second attempt of transmission occurs. In practice, the incorrect packet is not deleted, but is stored in a receiving buffer so as to be combined (Chase combining) with the block received at the second attempt. The result of the combination is then submitted to the decoder.

A second version of the HARQ protocol, the so-called HARQ Type II or IR HARQ (Incremental Redundancy HARQ) allows for the size of the forwarded packets to be reduced. According to this version, in the first transmission of the packet, the code is punctured so that few redundancy bits are transmitted. If the packet received in the first transmission turns out to be incorrect and cannot be corrected by means of redundancy bits available, additional redundancy bits, eliminated during puncturing, are transmitted in response to the first forwarding request. The process may repeat, the redundancy bits being transmitted incrementally, in accordance with forwarding requests, as long as the incorrect block cannot be corrected.

The conventional ARQ and HARQ request for forwarding protocols are not directly applicable to cooperative networks as they do not take into account the presence of relays.

Recently, other request for forwarding protocols have been proposed for cooperative networks. e.g., the international application WO2008/024158 describes a relay-assisted HARQ protocol. According to this protocol, if the destination terminal does not succeed in decoding the data received from the source terminal in a first transmission interval, the source terminal will forward the data in a second transmission interval. In parallel, if the relay terminal has been able to decode the data received in the first transmission interval, it will forward the data to the destination terminal during the second transmission interval. By default, the relay terminal will remain silent during this second interval. Thus, it should be understood that the relay, and thereby diversity combining and/or code combining contributed thereby is/are taken into account only if the first transmission has failed.

A second request for forwarding protocol for cooperative networks was proposed in the article by B. Zhao et al., entitled "A Generalization of Hybrid-ARQ", published in IEEE Journal on Selected Areas in Comm., vol. 23, no. 1, January 2005, pages 7-18. According to this protocol, at the beginning of the transmission interval the set D(s) of the nodes of the network having error-free knowledge of the data packet is taken into consideration. Thus, D(1) is reduced to the source terminal and D(2) comprises, in addition to the source terminal, the relay(s) having succeeded in decoding the data received in the first transmission interval. In the second transmission interval (s=2), from the relays belonging to D(2), the one closest to the destination terminal is selected, or else the one with the link having the highest instantaneous signal/noise ratio. The selected node ensures forwarding in the second transmission interval.

However, the proposed request for forwarding protocols have strong limitations.

Indeed, the protocol described in WO2008/024158 systematically makes use of data forwarding via the relay terminal, while the link between the same and the destination terminal may be deteriorated on the transmission resource used (frequency chunk in an OFDMA system). This transmission is then quite often useless.

The protocol described in the article cited selects the most suitable node for forwarding to the destination terminal, depending on a distance or signal/noise ratio criterion. However, if the link between the selected relay terminal and the destination terminal is deteriorated at the transmission resource used, this forwarding will probably be useless again.

The object of the present invention is to propose a forwarding protocol in a cooperative network which considerably reduces the probability of failure of the forwarding, in other words the probability that decoding of the data received by the recipient will lead to incorrect values. Similarly, the objective of the invention is to reduce the number of forwarding operations required for obtaining error-free decoding at the destination terminal.

SUMMARY OF THE INVENTION

This invention is defined by a forwarding method in a cooperative network comprising a plurality of nodes including a source terminal, a destination terminal, and at least one relay terminal, a data packet being transmitted by the source terminal to the destination terminal via at least said relay terminal, wherein a determination is made whether the data packet can be decoded without errors by a first node distinct from the source terminal and, if not, a determination is made whether at least one transmission channel routing said packet between at least one second node and said first node is in an outage state, and:

if said channel is in an outage state, said second node will retransmit the packet using a different transmission resource or a modulation and coding scheme with lower spectral efficiency than the one used by this node in the preceding transmission of said packet; and if said channel is not in an outage state, said second node will retransmit the packet using the same transmission resource as the one used by this same node in the preceding transmission of said packet.

According to a first variant, the first node being the destination terminal, the second node being the source terminal, and said relay terminal using an AF protocol, a determination is made whether the destination terminal can decode the data packet without errors, and if not, a determination is made whether the transmission channel between the source terminal and the destination terminal, relayed by the relay terminal, is in an outage state, and if said channel is in an outage state, for retransmission of said packet on the relayed channel, the source and relay terminals will use different transmission resources, or modulation and coding schemes different from those used for the preceding transmission of said packet on this channel; and in the opposite case, for retransmission of said packet on the relayed channel, the source and relay terminals will use the same transmission resources as those used for the preceding transmission of said packet on this channel.

According to a second variant, the first node being the destination terminal, the second node being the source terminal, and said relay terminal using an AF protocol, a determination is made whether the destination terminal can decode the data packet without errors, and if not, a determination is made whether the transmission channel between the source terminal and the destination terminal, relayed by the relay terminal is in an outage state, and in case of outage of the relayed channel (s-r-d), a verification is made by means of partial demodulation of the data received by the relay terminal if the transmission channel (s-r) between the source terminal and the relay terminal is in turn in an outage state, and if the relayed channel (s-r-d) is not in an outage state, for retransmission of said packet on the relayed channel, the source and relay terminals will use the same transmission resources as those used for the preceding transmission of said packet on this channel;

if the relayed channel (s-r-d) is in an outage state, but the channel (s-r) between the source terminal and the relay terminal is not, the source terminal will use the same transmission resource as the one used for the transmission of said packet on the channel (s-r) between the source terminal and the relay terminal in the preceding transmission, and the relay terminal will use a transmission resource different from the one used for the transmission of said packet on the channel (r-d) between the relay terminal and the destination terminal in the preceding transmission;

if the relayed channel (s-r-d) is in an outage state and the channel (s-r) between the source terminal and the relay terminal is out too, the source terminal will use a transmission resource different from the one used for the transmission of said packet on the channel (s-r) between the source terminal and the relay terminal in the preceding transmission, and the relay terminal will use the same transmission resource as the one used for the transmission of said packet on the channel (r-d) between the relay terminal and the destination terminal in the preceding transmission.

According to a third variant, the first node being the destination terminal, the second node being the relay terminal, and said relay terminal using a DF protocol, a determination is made whether the destination terminal can decode the data packet without errors, and if not, a determination is made whether the transmission channel (r-d) between the relay terminal and the destination terminal is in an outage state, and, if this channel is in an outage state, the relay terminal will use a transmission resource different from the one used for the transmission of said packet on the channel (r-d) between the relay terminal and the destination terminal in the preceding transmission, in the opposite case, the relay terminal will use the same transmission resource used for the transmission of said packet on the channel (r-d) between the relay terminal and the destination terminal in the preceding transmission.

In this case, prior to transmission of said packet by the relay terminal, advantageously a determination is made whether the relay terminal can decode the data packet without errors, and if not, a determination is made whether the transmission channel (s-r) between the source terminal and the relay terminal is in an outage state, and if this channel is in an outage state, the source terminal will use a transmission resource different from the one used for the transmission of said packet on the channel (s-r) between the source terminal and the relay terminal in the preceding transmission, and conversely, the source terminal will use the same transmission resource used for the transmission of said packet on the channel (s-r) between the source terminal and the relay terminal in the preceding transmission.

According to a fourth variant, the source terminal will on the one hand transmit said packet on a direct channel (s-d) and on the other hand on a relayed channel (s-r-d) to the destination terminal, the relay terminal operating according to a DF protocol and using the same code or a code different therefrom used by the source terminal for coding the packet prior to transmission thereof.

In this case, when the first node is the destination terminal and the second node is the relay terminal, a determination is made whether the destination terminal can decode without errors the packet received on the relayed channel, and if not, a determination is made whether the transmission channel (r-d) between the relay terminal and the destination terminal is in an outage state, and if this channel is in an outage state, the relay terminal will retransmit said packet on a transmission resource different from the one used for the transmission of said packet on the channel (r-d) between the relay terminal and the destination terminal in the preceding transmission, in the opposite case, the relay terminal will retransmit said packet on the same transmission resource used for the transmission of said packet on the channel (r-d) between the relay terminal and the destination terminal in the preceding transmission.

Before a determination is made whether the destination terminal can decode without errors the packet received on the relayed channel, first of all advantageously, a determination is made whether the destination terminal can decode without errors the packet received on the direct channel, and if not, a determination is made whether the relay terminal can then decode the packet without errors, and if this is still not the case, a verification is made if at least the direct channel (s-d) and the channel (s-r) between the source terminal and the relay terminal are in an outage state, and in case of outage of either of the channels, the source terminal will retransmit said packet on the direct and relayed channels, using a transmission resource different from the one used for the preceding transmission of said packet, if these two channels are not out, the source terminal will retransmit said packet on the direct and relayed channels, using the same transmission resource used for the preceding transmission of said packet.

Alternatively, if decoding of said packet is incorrect at the destination terminal but error-free at the relay terminal, the instantaneous mutual information on the channel (r-d) between the relay terminal and the destination terminal, and that on the direct channel (s-d) is compared, and if the first is greater than the second: the relay terminal will transmit said packet to the destination terminal;

in the opposite case:

a verification is made if at least the direct channel (s-d) or the channel (s-r) between the source terminal and the relay terminal is in an outage state, and in case one or the other channel is out, the source terminal will retransmit said packet on the direct and relayed channels, using a transmission resource different from the one used for the preceding transmission of said packet, if these two channels are not out, the source terminal will retransmit said packet on the direct and relayed channels, using the same transmission resource used for the preceding transmission of said packet.

According to a fifth variant, the source terminal will transmit on the one hand said packet on a direct channel (s-d) and on the other hand on a relayed channel (s-r-d) to the destination terminal, the relay terminal using a code different from the one used by the source terminal for coding the packet prior to transmission thereof, the destination terminal making a combination of the data received via the direct channel and via the relayed channel.

Said combination is done by concatenating the data received via the direct channel and that received via the relayed channel.

Alternatively, the source terminal will transmit on the one hand said packet on a direct channel (s-d) and on the other hand on a relayed channel (s-r-d) to the destination terminal, the relay terminal using the same code as that used by the source terminal for coding the packet prior to transmission thereof, the destination terminal making a combination of the data received via the direct channel and via the relayed channel. Said combination can be done by summation of the soft values of the data received via the direct channel and the soft values of the data received via the relayed channel.

In the two preceding instances, the destination terminal can perform decoding of said packet using the packet code received from the source terminal, on the one hand, and the packet received from the relay terminal, on the other hand and, in case said packet cannot be decoded without errors, a determination is made whether the composite channel (sd & rd) resulting from the combination of the direct channel (s-d) and the channel between the relay terminal and the destination terminal (r-d) is in an outage state, and if said composite channel is not out, the source terminal will retransmit said packet on the direct and relayed channels, using the same transmission resource used for the preceding transmission of said packet, and the relay terminal will forward said packet on the same transmission resource ($PRB_2$) used for the preceding transmission;

in case of outage of the composite channel, instantaneous mutual information on the channel (r-d) between the relay terminal and the destination terminal and that on the direct channel (s-d) is compared, and if the first is greater than the second:

the source terminal will retransmit said packet using a transmission resource different from the one used for the preceding transmission of said packet, and in the opposite case:

the relay terminal will retransmit said packet using a transmission resource different from the one used for the preceding transmission of said packet.

Finally, the method set forth above can be implemented in the case where the cooperative network is an OFDMA telecommunication system and the transmission resources consist of the subcarrier intervals of an OFDM multiplex or pluralities of such intervals.

BRIEF DESCRIPTION OF THE DRAWINGS

Other characteristics and advantages of the invention will be apparent from examining a preferred embodiment of the invention with reference to the appended figures, wherein.

DETAILED DESCRIPTION OF SPECIFIC EMBODIMENTS

Figure 1A:
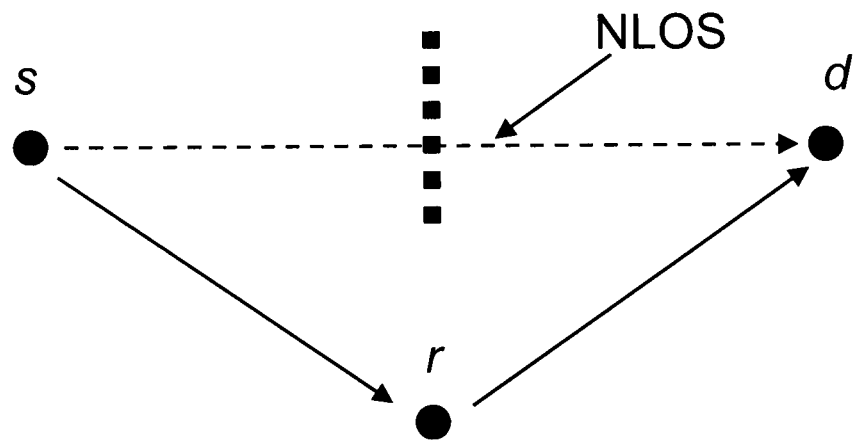
FIGS. 1A and 1B schematically illustrate two cooperation policies in a cooperative telecommunication system.

Hereafter, a cooperative telecommunication system, also called cooperative network, will be considered, comprising a source terminal s, at least one relay terminal r, and a destination terminal d. The term "source terminal" shall be construed broadly, the present invention being applicable in particular to the case where a base station is transmitting data to the terminal of a user on the downlink thereof. Also, the term "destination terminal" shall be construed broadly, the present invention being applicable in particular to the case where the terminal of a user is transmitting data to a base station on the uplink thereof. In the two cases specified, the data is relayed by the relay terminal, either to the base station for the uplink, or to the user's terminal for the downlink. Herein, the term "relay terminal" shall be construed broadly, as it may cover both a mobile terminal and a base station acting as a relay.

Hereafter, the assumption is that the cooperative telecommunication system preferably but not necessarily uses frequency transmission resources. The invention will be illustrated by a system of the OFDMA type without being restricted thereto. In such a system, the frequency resources are subcarrier intervals (frequency chunks) of an OFDM multiplex, wherein such a resource may be allocated to each terminal during a transmission interval (dynamic allocation or dynamic scheduling) or else during a sequence of such intervals (semi-persistent scheduling).

The transmission channels are assumed to be of the block fading type. In general, in a block fading channel, a message to be transmitted, e.g. a code word, will "see" a plurality of channel instances. Such instances can be time and/or frequency instances according to whether the channel is time or frequency selective. In the specific case of an OFDMA system, the channel instances seen by a code word are subcarrier intervals (frequency chunks) undergoing substantially the same fading.

The idea on which the invention is based is to diagnose among the links cooperatively participating in a transmission between a source terminal and a destination terminal, those which are in an outage state, deriving therefrom the nodes participating in the forwarding step, and possibly the transmission resources they may use.

It is to be recalled that the capacity according to Shannon, expressed as the average of the mutual information on all instances of the channel, is not a relevant quantity for characterizing a non-ergodic channel such as a radio channel. The notions of outage and probability of outage introduced by E. Biglieri et al. in his article entitled "Fading channels: information-theoretic and communication aspects", published in IEEE Trans. on Information Theory, vol. 44, no. 6, October 1998, pages 2619-2692, will then be used.

As a general rule, the radio channel is characterized at a given instant by the instantaneous mutual information of this channel, the instantaneous nature referring to the instance of the channel under consideration.

If I is to designate the instantaneous mutual information of the channel, the latter will be in an outage state if R>I where R is the bit rate. Once the channel is in an outage state, it will not be possible to correct a data packet which has been transmitted on this channel. Moreover, forwarding of this packet during the channel's coherence time (i.e. during the period of time when the fading coefficient thereof may be considered as having varied little) is also bound to fail.

It is to be recalled first of all how to calculate the instantaneous mutual information of a transmission channel in a conventional OFDMA telecommunication system before addressing the case of a cooperative system.

The instantaneous mutual information of an OFDM transmission channel between an emitter and a receiver can be obtained by means of the expression:

$$I_{inst} = \frac{1}{n_t n_c} \sum_{j=1}^{n_t} \sum_{i=1}^{n_c} I_{ij} \quad (1)$$

where $I_{ij}$ is the mean mutual information calculated for the subcarrier $i$ during the $j^{th}$ OFDM symbol time of the transmission interval under consideration, $n_t$ is the number of OFDM symbols during this interval, and $n_c$ is the number of subcarriers of the "chunk" used by the channel.

The behavior of the channel on a carrier can be considered, within the complex fading coefficient, as being of AWGN type (i.e. additive white Gaussian noise).

The assumption is that the symbols of a data packet modulating the $n_c$ subcarriers belong to a Q-ary alphabet. The receiver recognizes by means of a channel estimator the complex fading coefficients $h_{ij}$ affecting the various subcarriers during the transmission of the $j^{th}$ OFDM symbol time. In general, the channel estimator performs an estimation of certain complex fading coefficients at different instants of the transmission interval and for different subcarriers, the other coefficients being determined by time and/or frequency interpolation. The channel estimator may conventionally use the detection of pilot symbols distributed over the subcarriers in the frame of OFDM symbols in a manner known as such.

Furthermore, detection of pilot symbols allows to obtain an estimate of the noise variance $\sigma^2$. Mutual information $I_{ij}$ is then expressed by:

$$I_{ij} = \log Q - \frac{1}{Q} \sum_{k=1}^{Q} E_z \left\{ \log \left( \sum_{q=1}^{Q} \exp \left[ -\frac{|h_{ij} a_k + z - h_{ij} a_q|^2 - |z|^2}{2\sigma^2} \right] \right) \right\} \quad (2)$$

where $a_q=1, \ldots, Q$ are the symbols of the modulation alphabet modulating the subcarriers during the OFDM symbol time under consideration, $z=N(0,\sigma^2)$ is the random variable describing the noise on each subcarrier and $E_z(.)$ is the expectancy on the noise samples, with the log here being base 2.

Instantaneous mutual information can then be expressed as:

$$I_{inst} = \frac{1}{n_t n_c} \sum_{j=1}^{n_t} \sum_{i=1}^{n_c} I_{ij} \left( \frac{|h_{ij}|^2}{\sigma^2} \right) \quad (3)$$

conveying dependency thereof with respect to the signal/noise ratio $$\frac{|h_{ij}|^2}{\sigma^2}$$

on each subcarrier.

In practice, for each discrete value of the power of noise $\sigma^2$, the corresponding instantaneous mutual information is calculated by simulation. These values may then be stored directly in a table or LUT (Look Up Table). Alternatively, it is possible for the coefficients of a polynomial approximation of $I_{ij}$ to be derived from these values, depending on $\sigma^2$, and for the coefficients thus calculated to be stored in a table.

In a cooperative network, the expression (3) can be used for calculating the instantaneous mutual information of the channel between a source terminal and a relay terminal, between a relay terminal and a destination terminal, and of the direct channel between the source and destination terminals. If the data is subjected to K successive transmissions on the same link, the instantaneous mutual information on this link will appear as:

$$I_{inst} = \frac{1}{n_t n_c} \sum_{j=1}^{n_t} \sum_{i=1}^{n_c} I_{ij} \left( \sum_{k=1}^{K} \frac{|h_{ij}|^2}{\sigma_k^2} \right) \quad (4)$$

where $h_{ij}^k$ is the fading coefficient on the channel under consideration related to the subcarrier i, the OFDM symbol j during the k-th transmission.

Figure 1B:
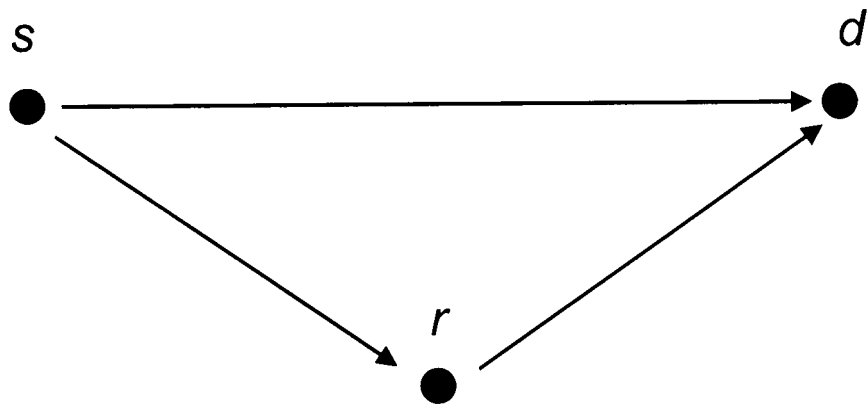
Figure 2A:
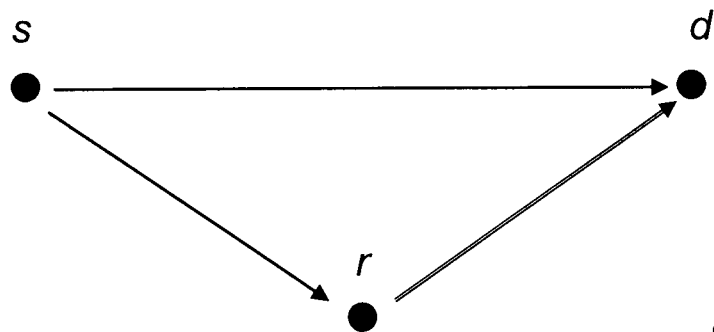
FIGS. 2A to 2C illustrate three examples of transmission protocols in a cooperative network.
Figure 2B:
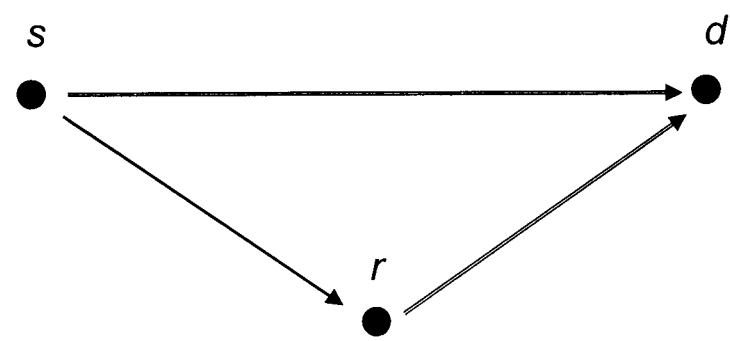
Figure 2C:
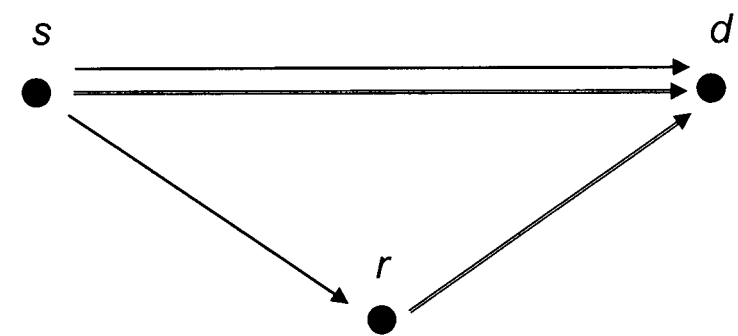

If we consider now the case of a cooperation policy of the type of FIG. 1B with an AF forwarding protocol, the instantaneous mutual information of the relayed channel is expressed by:

$$I_{inst} = \frac{1}{n_t n_c} \sum_{j=1}^{n_t} \sum_{i=1}^{n_c} I_{ij} \left( \sum_{k=1}^{K} \frac{|h_{ij}^k(sd)|^2}{2\sigma_k^2} + \sum_{p=1}^{P} \frac{|h_{ij}^p(sr)|^2 |h_{ij}^p(rd)|^2}{2G|h_{ij}^p(rd)|^2 \sigma_p^2 + 2\sigma_p^2} \right) \quad (5)$$

where K is the number of transmissions of the data on the direct channel s-d, P is the number of forwarding operations of this data on channel r-d, G is the amplifying gain of the relay, $h_{ij}^k(sd)$, $h_{ij}^k(sr)$ and $h_{ij}^p(rd)$ respectively are the fading coefficients related to the channels s-d, s-r and r-d, for the k-th and the p-th transmission on these channels, the subcarrier i and the OFDM symbol j of the transmission interval.

It is to be noted that in the specific case of a cooperation policy of the type of FIG. 1A, and still for an AF forwarding protocol, the expression (5) is simplified as:

$$I_{inst} = \frac{1}{n_t n_c} \sum_{j=1}^{n_t} \sum_{i=1}^{n_c} I_{ij} \left( \sum_{p=1}^{P} \frac{|h_{ij}^p(sr)|^2 |h_{ij}^p(rd)|^2}{G|h_{ij}^p(rd)|^2 \sigma_p^2 + 2\sigma_p^2} \right) \quad (6)$$

Similarly, if the forwarding protocol is of DF type, the instantaneous mutual information on the relayed channel can be evaluated as:

$$I_{inst} = \frac{1}{n_t n_c} \sum_{j=1}^{n_t} \sum_{i=1}^{n_c} I_{ij} \left( \sum_{k=1}^{K} \frac{|h_{ij}^k(sd)|^2}{2\sigma_k^2} + \sum_{p=1}^{P} \frac{|h_{ij}^p(rd)|^2}{2\sigma_p^2} \right) \quad (7)$$

with the same conventions of notation as before. More precisely, the expression (7) is valid for the case in which the relay terminal uses a code identical to that of the source terminal (constrained code) and in which the soft values of the data received from r and s are simply combined at d. Hereafter, this configuration will be designated as "DF with diversity combining" because of the analogy with a SIMO (Single Input Multiple Output) system having two receiving antennae (a first antenna receiving the signal directly from the source and a second antenna receiving the signal from the relay).

If the forwarding protocol is of the DF type, but the source and relay terminals use different codes, decoding can be done at the destination terminal by means of the concatenated data received from s on the one hand and that received from r on the other hand, in a manner known as such. If applicable, it would be possible to make use of iterative decoding, e.g. turbo decoding using the data received from s and r. Hereafter, this configuration will be called "DF with code combining" so as to differentiate it from the preceding configuration.

The instantaneous mutual information of the relayed channel may then be expressed in this case by:

$$I_{inst} = \frac{1}{n_t n_c} \sum_{j=1}^{n_t} \sum_{i=1}^{n_c} I_{ij} \left( \sum_{k=1}^{K} \frac{|h_{ij}^k(sd)|^2}{2\sigma_k^2} \right) + \quad (8)$$

$$\frac{1}{n_t n_c} \sum_{j=1}^{n_t} \sum_{i=1}^{n_c} I_{ij} \left( \sum_{p=1}^{P} \frac{|h_{ij}^p(rd)|^2}{2\sigma_p^2} \right)$$

with the same conventions of notation as before.

The presence of a coefficient 2 for the denominator of the expressions (5), (7), and (8) is to be noted. This coefficient takes into account the fact that the transmission is done at constant power and that the power of transmission is equally distributed between the source terminal and the relay terminal when recombination is performed at the destination terminal. Of course, if another power distribution is envisaged, the expressions involved are to be modified accordingly. In general, it will be understood that if the cooperative network makes use of N−1 relays operating in parallel, the coefficient at the denominator will be equal to N (in case of equal power distribution).

Expressions (7) to (8) may be generalized for any number of relays.

Figure 3:
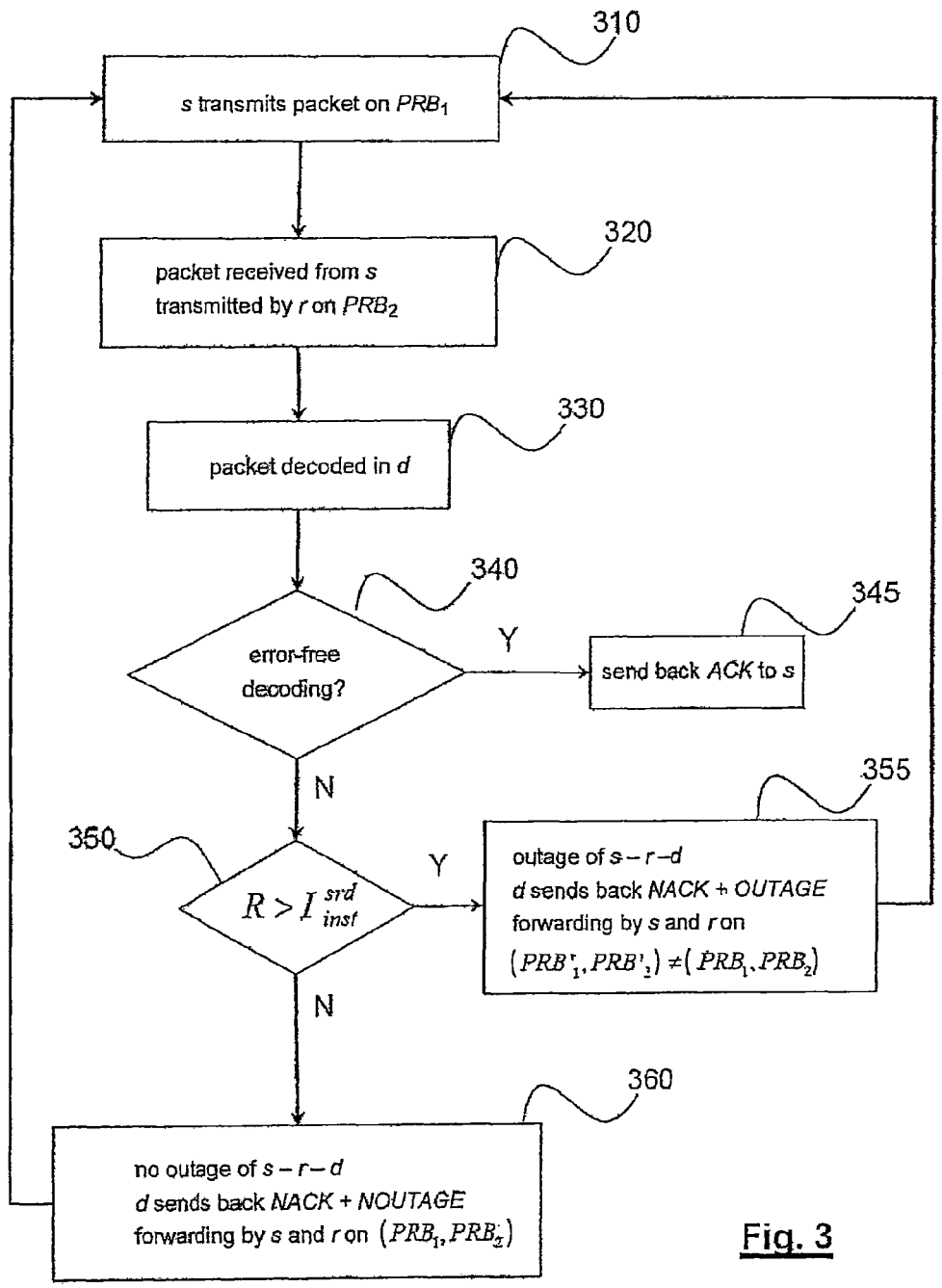
FIG. 3 schematically illustrates a request for forwarding protocol in a cooperative network with AF relaying, according to a first specific embodiment of the invention.

FIG. 3 schematically illustrates a forwarding method for a cooperative network of the type of FIG. 1A, according to a first specific embodiment of the invention.

By way of simplification, but without prejudice to generalization, the assumption is first of all that the network only comprises one relay and that the latter merely amplifies and retransmits the data it receives from the source terminal (AF configuration).

In step 310, the source terminal transmits a data packet to the relay terminal using a first transmission frequency resource $PRB_1$, e.g. a subcarrier interval (or a plurality of such intervals) if the telecommunication system is of the OFDMA type.

In step 320, the signal received by the relay terminal is amplified and forwarded thereby on a second frequency resource $PRB_2$.

In step 330, the signal received is demodulated and decoded by the destination terminal. If the packet can be decoded without errors, 340, an acknowledgement of correct receipt, ACK, is sent back to the source terminal in 345. If not, i.e. if the error correcting code cannot correct the errors affecting the data, a determination is made in step 350 whether the bit rate used for transmission of the data, R, is greater than the instantaneous mutual information of the relayed channel s-r-d, noted $I_{inst}^{srd}$. In the case of an OFDMA system, $I_{inst}^{srd}$ can be obtained by means of expression (6) (with K=1).

If $R \leq I_{inst}^{srd}$, the relayed channel is not in an outage state, information indicating the same, NOUTAGE, is sent back to the source terminal. The source terminal performs a retransmission of the data using the resource $PRB_1$ and the relay terminal forwards it by means of the resource $PRB_2$ as before.

If $R > I_{inst}^{srd}$, the relayed channel is in an outage state and forwarding on this channel under the same conditions would necessarily lead to another failure. A negative acknowledgement, NACK, indicating a decoding error as well as information indicating the outage state, OUTAGE, are sent back to the source terminal and the relay terminal (if applicable, the signals NACK and OUTAGE can be in turn relayed by r in case is out of range of d).

At this point, different variants can be envisaged.

According to a first variant, the source terminal receiving the information NACK and OUTAGE will retransmit the data by means of a resource $PRB'_1$ distinct from $PRB_1$. The relay terminal will forward to the destination terminal the data it has received on $PRB'_1$, by means of a resource $PRB'_2$ distinct from $PRB_2$. The terminal r may be informed directly of the outage state with the signal NOUTAGE sent back by d. Alternatively, it may receive an order of reallocation of resources transmitted by s. Further alternatively, the terminals s and r may receive orders of reallocation of resources from a dedicated node, managing the outage states for all or part of the network.

According to a second variant not shown, the relay terminal performs partial demodulation of the data received, e.g. pilot symbols contained in the data packet, so as to determine if the channel s-r is in an outage state by comparing the instantaneous mutual information $I_{inst}^{sr}$ with the rate R used. For the calculation of $I_{inst}^{sr}$, expression (4) (with K=1) related to channel s-r may be used. If $I_{inst}^{sr} > R$, an outage state is diagnosed and information indicating the same, $OUTAGE_r$ is sent back to the source terminal. In the opposite case, information of no outage, $NOUTAGE_r$, is sent back. In this second variant, the resources used for forwarding by the source and relay terminals are determined as:

OUTAGE and $NOUTAGE_r$: s uses $PRB'_1$ and r uses $PRB_2$
OUTAGE and $OUTAGE_r$: s uses $PRB_1$ and r uses $PRB'_2$ Indeed, in the first case, the outage of the relayed channel will be put down to that of channel s-r, and in the second case to that of channel r-d. The reallocation of resources may be controlled by the source terminal or by a dedicated control node.

In the embodiment set forth above, the proposal is to overcome an outage state of the relayed channel by performing a reallocation of the resources of the source terminal and/or the relay terminal when the data is forwarded. Advantageously, when a resource $PRB_1$ or $PRB_2$ diagnosed as being in an outage state for channel s-r or r-d, it will not be reallocated during coherence time of the channel.

As an alternative to a reallocation of resources, provision can be made to preserve resources allocated to forwarding, but to reduce the rate on the relayed channel so as to satisfy the condition $R \leq I_{inst}^{srd}$, e.g. by choosing a more robust modulation and coding scheme or MCS.

Finally, whichever variant is envisaged, the data received in the first transmission and later forwarding operation(s) may be combined so as to improve the signal/noise ratio upon receipt and reduce the number of forwarding operations required for obtaining decoding without errors. In this case, expression (4) (for $I^{sr}$) or (6) (for $I^{srd}$) can be used, where K is the number of transmissions on the channel involved, for estimating the corresponding instantaneous mutual information.

Figure 4:
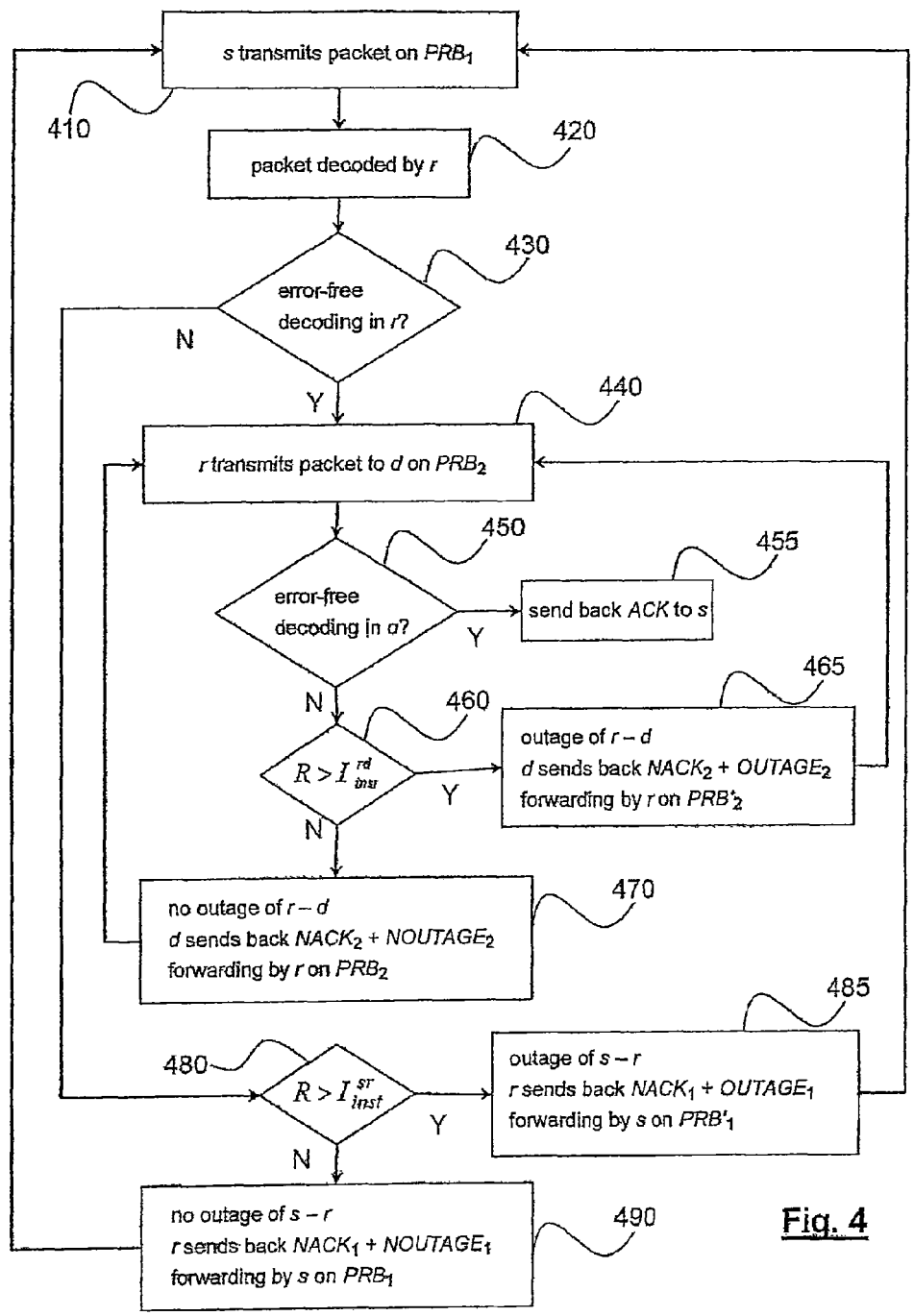
FIG. 4 schematically illustrates a forwarding method for a cooperative network with DF relaying, according to a second specific embodiment of the invention.

FIG. 4 schematically illustrates a forwarding method for a cooperative network of the type of FIG. 1A, according to a second specific embodiment of the invention. In contrast to the preceding embodiment, it is assumed that the relay terminal will decode the data received from the source terminal, and forward it to the destination terminal after recoding the same by means of an identical code or a different code (DF configuration).

In contrast to the first embodiment, herein the outage test advances from the source terminal to the destination terminal.

More precisely, in step 410, the source terminal will transmit a data packet to the relay terminal, on frequency resource $PRB_1$.

In step 420, the data received at the relay terminal is decoded, and a determination is made in 430 whether the packet can be decoded without errors. If not, the process advances to step 480.

In contrast, if the relay terminal can decode the data without errors, it will transmit the same to the destination terminal by means of a frequency resource $PRB_2$. The code used by the relay terminal may be identical (constrained coding) or not with the one used by the source terminal.

It is then tested in 450 whether the destination terminal has succeeded in decoding the data received from the relay terminal. If so, a message acknowledging correct receipt, ACK, is sent back to the source terminal in 455. In contrast, if the data packet comprises errors that the destination terminal cannot correct, the process advances to step 460.

In 460, a test is made whether the bit rate used for the transmission between r and d is greater than the instantaneous mutual information on channel r-d, in other words whether $R > I_{inst}^{rd}$. It is to be recalled that if the system is of the OFDMA type, $I_{inst}^{rd}$ may be calculated from the expression (4) (with K=1).

If $R > I_{inst}^{rd}$, the channel r-d is diagnosed as being in an outage state, and the destination terminal will send back to the relay terminal, in 465, a negative acknowledgement $NACK_2$ as well as outage information $OUTAGE_2$. The relay receiving such information will forward the data packet by means of a time resource $PRB'_2$ distinct from $PRB_2$. Indeed, transmission on the same resource during the second attempt would very likely be bound to fail. This second transmission is performed by returning to step 440 (and replacing $PRB_2$ with $PRB'_2$).

If, on the other hand, $R \leq I_{inst}^{rd}$, channel r-d is not in an outage state. A negative acknowledgement $NACK_2$ and no outage information $NOUTAGE_2$ are sent back by the destination terminal to the relay terminal. The latter will then retransmit the data packet in 470, by means of the same resource as the one used for the first transmission, namely $PRB_1$.

In step 480, i.e. if the relay has not succeeded in decoding the data received, a test is made whether the bit rate used for transmission between s and r is greater than the instantaneous mutual information on channel s-r, in other words whether $R > I_{inst}^{sr}$ (if the system is of the OFDMA type, $I_{inst}^{sr}$ is calculated by means of expression (4), with K=1).

If $R > I_{inst}^{sr}$, the channel s-r is diagnosed as being in an outage state. The relay terminal will then transmit to the source terminal a negative acknowledgement NACK, (indicating that the data packet cannot be decoded without errors) as well as outage information $NOUTAGE_1$, in 485. A new transmission resource $PRB'_1$ is allocated to the source terminal for retransmitting a data packet in step 410 ($PRB_1$ being replaced with $PRB'_1$).

Conversely, if $R \leq I_{inst}^{sr}$, channel s-r is not in an outage state. Information indicating no outage, $NOUTAGE_1$, as well as a negative acknowledgement $NACK_1$ are sent back by the relay terminal to the source terminal. The process then returns to step 410: the source terminal will retransmit the data packet by means of the same frequency resource as for the first transmission, namely $PRB_1$.

As in the first embodiment, different variants can be envisaged. In particular, a resource ($PRB_1$ or $PRB_2$) in an outage state cannot be allocated to the terminal involved during a period of time corresponding to the coherence time of the channel (s-r or r-d). Furthermore, as set forth above, when forwarding, it may be preferred to reduce the spectral efficiency of the MCS scheme used rather than to perform a reallocation of resources. Finally, the packets received by the relay terminal or the destination terminal, during several consecutive transmissions of the same data, can be combined so as to increase the signal/noise ratio, with the instantaneous mutual information $I_{inst}^{sr}$ or $I_{inst}^{rd}$ possibly being estimated by taking into account the K packets received in expression (4).

Figure 5:
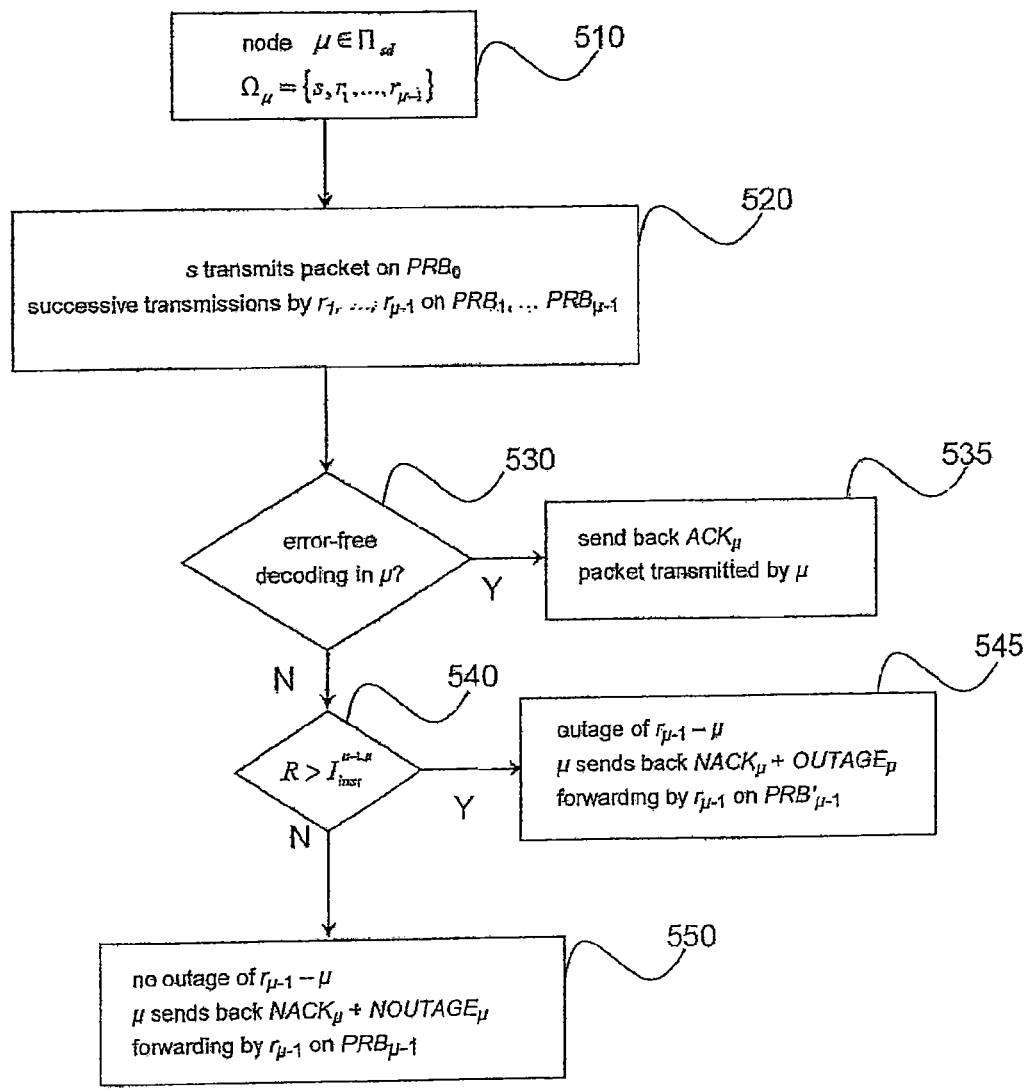
FIG. 5 schematically illustrates a forwarding method for a cooperative network, according to a third embodiment of the invention.

FIG. 5 illustrates a forwarding method in a cooperative network of the type of FIG. 1A, according to a third embodiment of the invention.

The assumption is here that the cooperative network comprises a source terminal s, a destination terminal d, and a non-empty set of relay terminals, $\Lambda_r$. In general, the cooperative network can be considered as a directed graph the nodes of which are the terminals, the segments of which are the links between terminals, the direction of a segment being given by the direction of transmission.

The cooperation policy of FIG. 1A is going to be considered, in other words, there is a directed path $\Pi_{sd}$ in the graph, starting at s and leading to d and going through an ordered sequence of relays $\{r_1, r_2, \ldots, r_M\}$ with $M \geq 1$. $\Omega = \{s, r_1, \ldots, r_M, d\}$ is defined as the ordered sequence of the nodes of the path $\Pi_{sd}$, and $\Omega_\mu = \{s, r_1, \ldots, r_{\mu-1}\}$ as the ordered sequence of the predecessors of the node µ, with the same relation of order as before. Conventionally, $\Omega_1=\{s\}$ and $\Omega_{M+1}=\Omega=\Omega-\{d\}$ will be adopted.

In step 510, a node µ of path $\Pi_{sd}$ distinct from s is taken into consideration. Let $\Omega_\mu$ be the ordered list associated with µ.

In 520, the source terminal transmits a data packet by means of a transmission resource $PRB_0$. The relay(s) $r_1, \ldots, r_{\mu-1}$ will successively transmit this packet with the respective resources $PRB_1, \ldots, PRB_{\mu-1}$, according to an AF or DF protocol. However, in case of an AF protocol, only one relay will be used in general.

A test is made in 530 whether node µ has been able to decode without errors the data received. If so, node µ will transmit an acknowledgement of receipt $ACK_\mu$, and transmit in turn the data packet in 535. The process then advances to the next node.

On the other hand, in case of error, it is determined in 540 if the bit rate R is greater than the instantaneous mutual information, $I_{inst}^{\mu-1,\mu}$ for channel $r_\mu - r_{\mu-1}$. Forwarding is then done only by node $r_{\mu-1}$ with the same transmission resource, if the channel is not in an outage state, and with a different resource different if this channel is in an outage state (knowing that if $\mu=r_1$, the relayed channel is reduced to a single channel).

It is to be understood that the first embodiment is a specific case of this third mode with µ=d, and that the second embodiment is also a specific case with µ=r.

Figure 6:
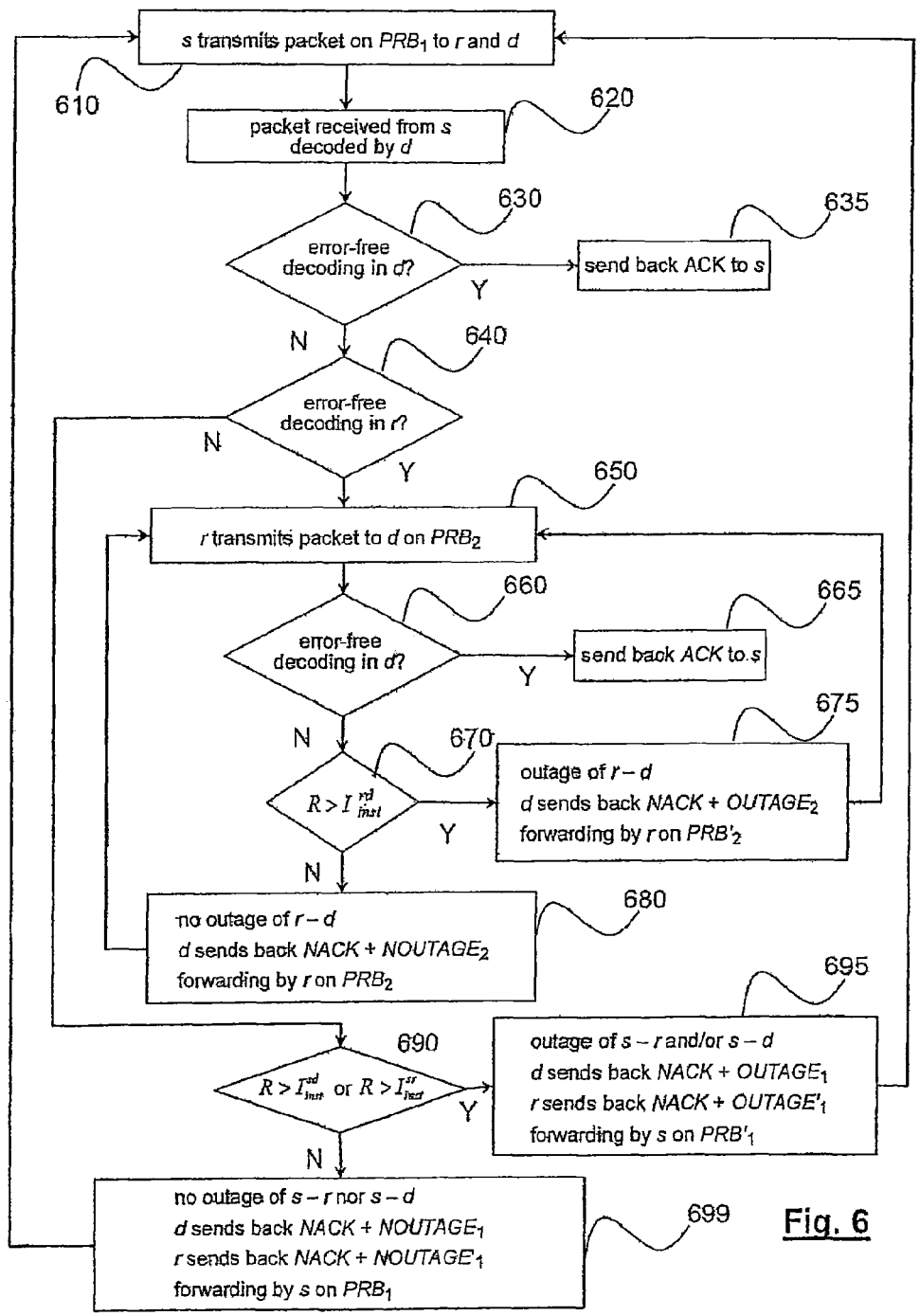
FIG. 6 schematically illustrates a forwarding method for a cooperative network, with DF relaying, according to a fourth specific embodiment of the invention.

FIG. 6 schematically illustrates a forwarding method for a cooperative network, according to a fourth specific embodiment of the invention. Unlike the preceding embodiments, the cooperation policy envisaged here is of the type of FIG. 1B, in other words, the destination terminal receives the data both via the direct channel s-d and via a relayed channel s-r-d, but no combination is envisaged at the destination terminal of the data received via the direct channel and the relayed channel.

The assumption is that the transmission protocol used is of the DF type.

In step 610, the source terminal transmits a data packet to the destination terminal (direct channel) and the relay terminal (relayed channel), by means of a transmission resource $PRB_1$.

In step 620, the destination terminal decodes the data received from the source terminal and determines in 630 if the packet thus decoded is error-free.

If so, a signal acknowledging correct receipt ACK is sent back to the source terminal, in 635. On the other hand, in case of error, the process advances to step 640.

In 640, a determination is made whether the relay terminal as such has succeeded in decoding the data packet (no errors).

If not, the process advances to step 690, described below. On the other hand, if decoding was successful, the relay terminal transmits, in 650, said data packet to the destination terminal, using the same code as the source terminal, namely by means of a transmission resource $PRB_2$.

A test is then made in 660 whether the destination terminal has succeeded in decoding the data packet thus transmitted by the relay terminal.

In case of success, an acknowledgement of correct receipt, ACK, is sent back, in 665, by the destination terminal to the source terminal.

On the other hand, in case of failure, a determination is made in 670 whether the bit rate used for the transmission is greater than the instantaneous mutual information on channel r-d, noted $I_{inst}^{rd}$.

If $R>I_{inst}^{rd}$, channel r-d is in an outage state and the destination terminal will signal this, in 675, to the relay terminal by transmitting thereto the outage information $OUTAGE_2$, with the negative acknowledgement NACK (decoding failure). A new resource is allocated, $PRB'_2 \neq PRB_2$ to the relay terminal for a transmission retry in 650.

Conversely, if $R \leq I_{inst}^{rd}$, the channel r-d is not in an outage state. The destination terminal signals this to the relay terminal, in 680, by transmitting thereto the no outage information $NOUTAGE_2$, again with the negative acknowledgement NACK. Allocation of the resource $PRB_2$ is maintained during the second attempt of transmission by the relay terminal in 650.

In step 690, i.e. if the packet could not be successfully decoded by the relay terminal, a determination is made whether the bit rate is greater than the instantaneous mutual information of the channel s-d or that of channel s-r.

If $R>I_{inst}^{sd}$ or $R \leq I_{inst}^{sr}$, at least one of the two channels s-d and s-r is in an outage state. Outage information $OUTAGE_1$ and/or $OUTAGE'_1$ is then sent back, in 695, to the source terminal, respectively by the destination terminal and/or the relay terminal. A new resource $PRB'_1$ is then allocated to the source terminal for a second attempt of transmission in 610.

Conversely, if $R \leq I_{inst}^{sd}$ and $R \leq I_{inst}^{sr}$, in other words if neither of the two channels s-d and s-r is in an outage state, the source terminal performs a transmission retry of the packet by means of the resource already allocated, $PRB_1$, in 699.

According to a variant (not shown), after making sure in 640 that decoding was successful at the relay terminal, a verification is made if $I_{inst}^{rd} \geq I_{inst}^{sr}$, in other words if the instantaneous mutual information on channel r-d is greater than that of channel s-r. If so, the process continues normally in 650, with the transmission by the relay on resource $PRB_2$. As $I_{inst}^{rd} \geq I_{inst}^{sr}$, the transmission is likely to be successful in 660.

On the other hand, if $I_{inst}^{rd} \leq I_{inst}^{sr}$, the relay terminal does not transmit the packet to the recipient on the resource $PRB_2$. Indeed, as the transmission on channel s-d by means of $PRB_1$ already resulted in failure and the transmission on channel r-d by means of $PRB_2$ might fail due to the fact that $I_{inst}^{rd} < I_{inst}^{sr}$, the outage state of channels s-d and s-r is checked by moving to step 690.

The variants envisaged for the first and second specific embodiments are applicable again and consequently, the description thereof will not be repeated here. In particular, it is obvious for the person skilled in the art that it is possible to choose an MCS scheme of lower spectral efficiency in case of a transmission failure, instead of a transmission resource reallocation.

Figure 7A:
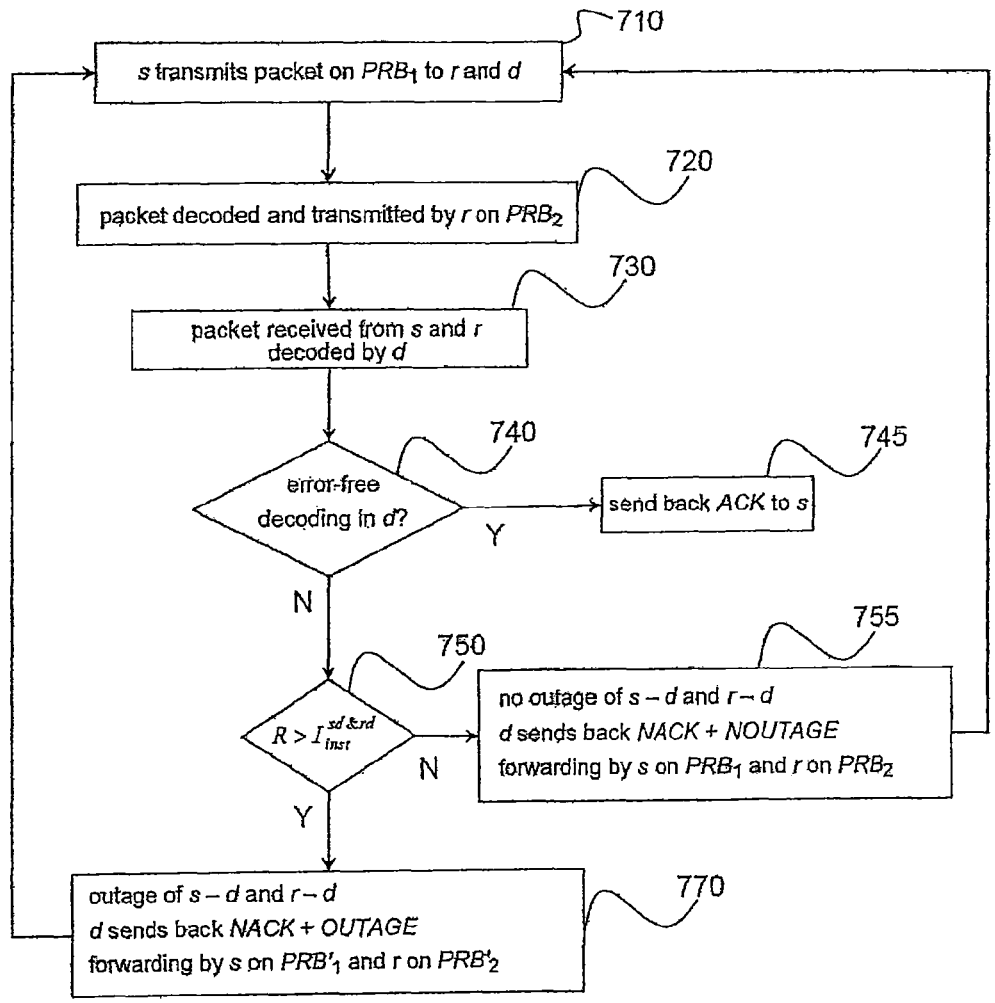
FIG. 7A schematically illustrates a forwarding method for a cooperative network, with DF relaying, according to a fifth specific embodiment of the invention.

FIG. 7A schematically illustrates a forwarding method for a cooperative network, according to a fifth specific embodiment of the invention. As in the fourth mode, the destination terminal receives the data both via the direct channel s-d and via a relayed channel s-r-d (cooperation policy of FIG. 1B). According to this embodiment, a combination of the data received via the direct channel and the relayed channel is performed.

Here again, the assumption is that the transmission protocols used is of the DF type.

In step 710, the source terminal transmits a data packet to the destination and relay terminals, by means of a transmission resource $PRB_1$.

In step 720, the relay terminal decodes the packet and, if decoding is successful, transmits the same to the recipient on a transmission resource $PRB_2$, after recoding the same (by means of a code different from the one used by the source terminal or an identical code). On the other hand, if decoding has failed, the relay terminal does not transmit the packet to the destination terminal.

In 730, the destination terminal decodes the data received from the packet by means of decoding using the versions respectively encoded by the source terminal and the relay terminal (diversity combining or code combining). This decoding may be iterative (turbo decoding), the source and relay terminals then acting as a space distributed turbo encoder.

In 740, a determination is made whether the destination terminal can decode the packet without errors. If so, it transmits an acknowledgement of correct receipt to the source terminal in 745.

On the other hand, if errors are present in the decoded packet, a determination is made in 750 whether the bit rate used for the transmission is lower than the mean mutual information of the composite channel, resulting from the combination of the channels s-d and r-d, i.e. $I_{inst}^{sd\&rd}$. If the system is of the OFDMA type, $I_{inst}^{sd\&rd}$ can be evaluated by means of the expression (7) (DF with diversity combining) or (8) (DF with code combining).

If $R \leq I_{inst}^{sd\&rd}$, the composite channel is not in an outage state. A negative acknowledgement NACK as well as no outage information NOUTAGE are then sent back, in 755, to the source and relay terminals. Next, retransmission of the source terminal is performed using the same resource $PRB_1$, then the relay terminal with the same resource $PRB_2$. In the flow chart, this is expressed by a return in 710.

If $R > I_{inst}^{sd\&rd}$, the composite channel is in an outage state, and the destination terminal informs the source and relay terminals by means of corresponding information, NOUTAGE, in 770. A negative acknowledgement signaling the decoding error, NACK, is also sent back to these terminals. Then, a new transmission resource, $PRB'_1$, is allocated to the source terminal as well as a new transmission resource $PRB'_2$, to the relay terminal. A transmission retry by the source terminal and then by the relay terminal is then initiated. This is expressed in the flow chart by a return to 710 ($PRB'_1$ replacing $PRB_1$ in 710 and $PRB'_2$ replacing $PRB_2$ in 720).

As in the third embodiment, it may be preferred to choose an MCS scheme with lower spectral efficiency in case of transmission failure, instead of choosing the allocation of a new transmission resource.

Figure 7B:
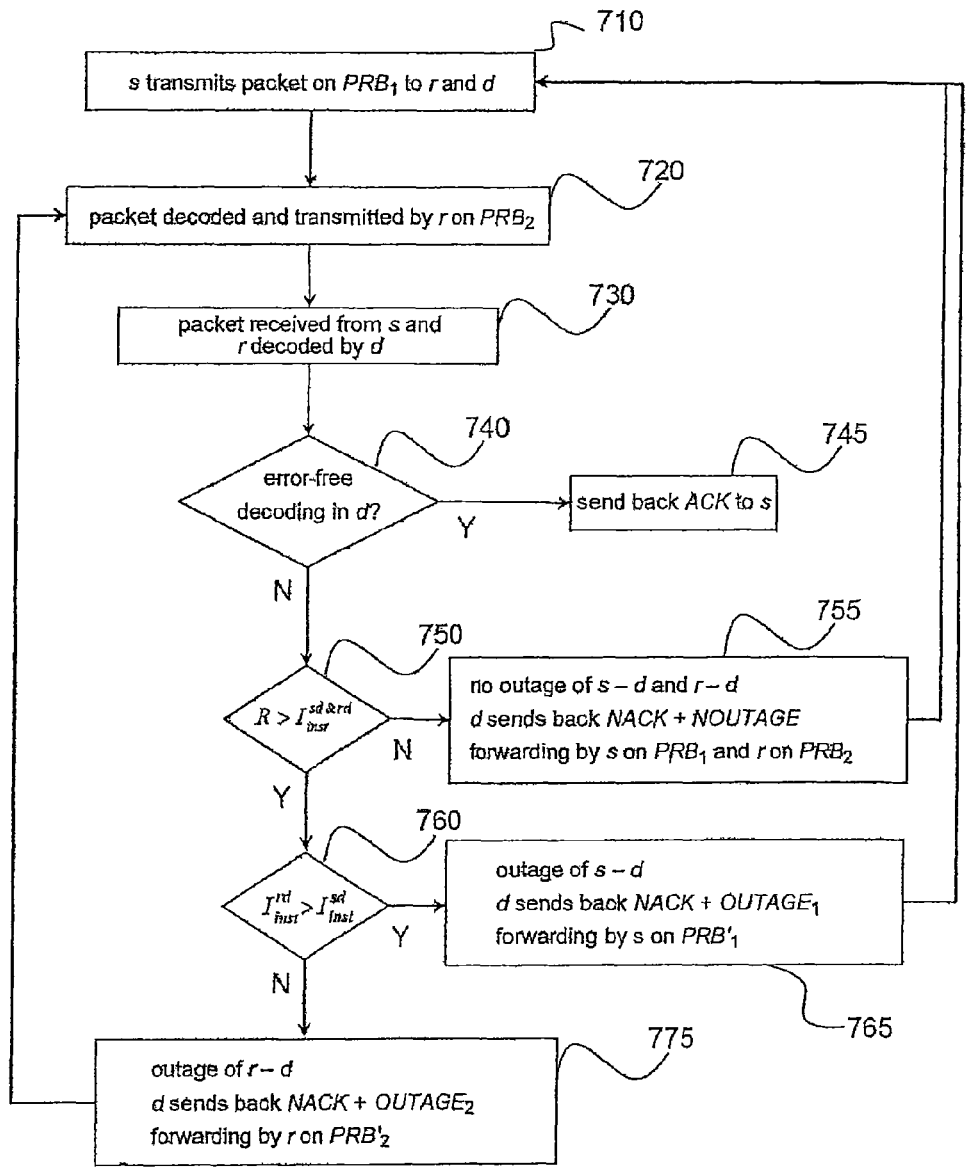
FIG. 7B schematically illustrates a forwarding method for a cooperative network, with DF relaying, according to a variant of the fifth specific embodiment of the invention.

FIG. 7B schematically illustrates a variant of the fifth specific embodiment.

This variant is the same as that of FIG. 7A except that in case of outage, a retransmission of the source and then the relay terminals is not performed straightaway, but a distinction is made as to which one of the direct channel s-d and the relayed channel s-r-d is more likely to be defective.

For this purpose, in case outage of the composite channel is diagnosed, in 760, the instantaneous mutual information on channel r-d and that on channel s-d is compared.

If $I_{inst}^{rd} > I_{inst}^{sd}$, in 765 channel s-d is declared to be in an outage state, and corresponding outage information, OUTAGE$_1$, is sent back to the source terminal. A negative acknowledgement, NACK is also sent back to this terminal. Finally, the source terminal performs a transmission retry by means of a new resource $PRB'_1 \neq PRB_1$ which had previously been allocated thereto by returning to step 710.

Conversely, if $I_{inst}^{rd} \leq I_{inst}^{sd}$, analogously in 775 channel r-d is declared to be in an outage state, and corresponding outage information, OUTAGE$_2$, is sent back to the relay terminal. A negative acknowledgement of receipt, NACK is also sent back to this terminal. Finally, the relay terminal performs a transmission retry by means of a new resource $PRB'_2 \neq PRB_2$ which had previously been allocated thereto by returning to step 720.

Figure 8:
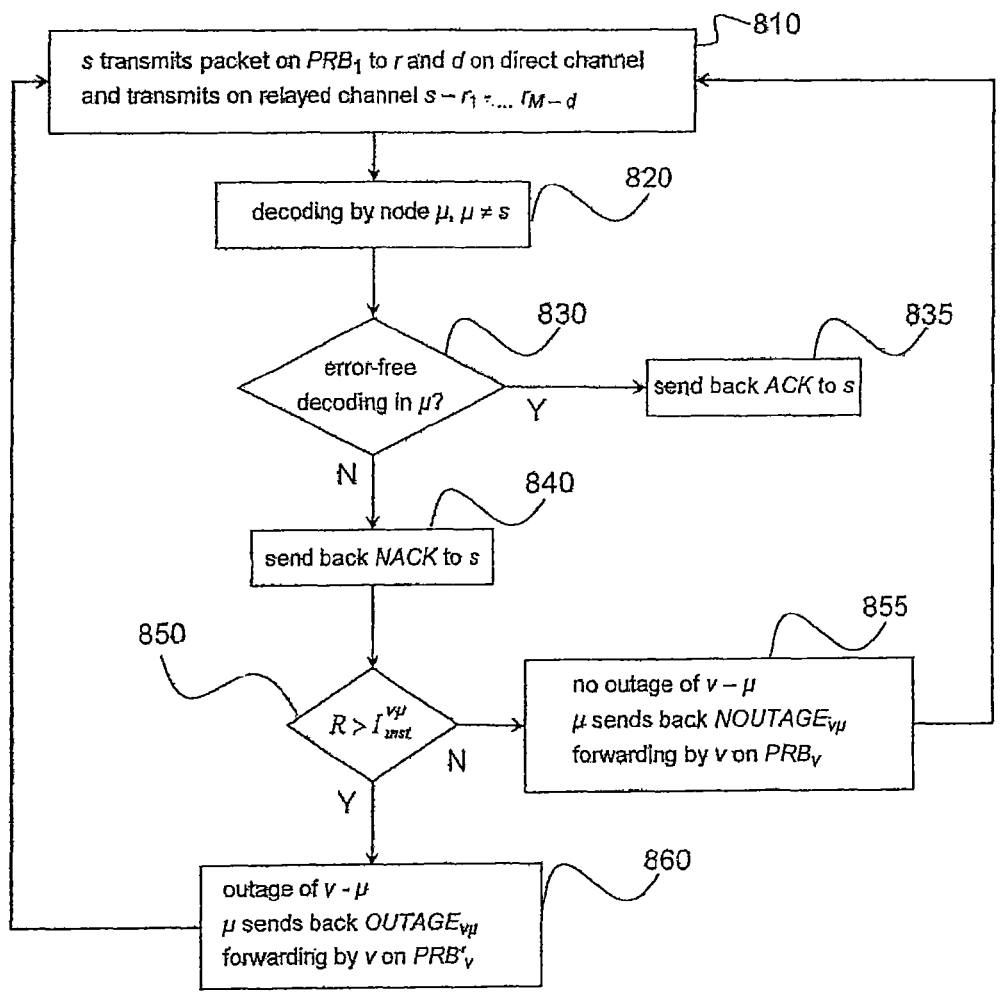
FIG. 8 schematically illustrates a forwarding method for a cooperative network, according to a general embodiment of the invention.

FIG. 8 schematically illustrates a forwarding method in a cooperative network, according to a general embodiment of the invention.

Again, a cooperative network comprising a set of nodes including a source terminal, a destination terminal, and a set of relays $\{r_1, \ldots, r_M\}$ with $M \geq 1$ is taken into consideration.

In step 810, the source terminal transmits a data packet, which is relayed by one or several relay terminals operating according to an AF or DF protocol. However, in case of an AF protocol, only one relay will be used.

In step 820, the packet is decoded in a first node of the network, $\mu$, distinct from the source terminal, and a determination is made in 830 whether this packet can be decoded successfully (without errors). If so, a signal acknowledging correct receipt ACK is sent back to the source terminal in 825, and possibly to the predecessor nodes of $\mu$.

Conversely, in case of error, in step 840, the node $\mu$ sends back a negative acknowledgement NACK, and a determination is made in 850 whether at least one channel of the network (relayed or not) between the predecessor of node $\mu$, noted $\nu$ ($\nu = \mu - 1$ if $\mu > 1$ and $\nu$ is the source terminal if $\mu = 1$), and the node $\mu$ is in an outage state. For this purpose, the bit rate, R, used for the transmission of the packet, and the instantaneous mutual information on the channel $\nu$-$\mu$ are compared.

If $R \leq I_{inst}^{\nu\mu}$, the channel $\nu$-$\mu$ is not in an outage state and the first node p signals this by means of the information NOUTAGE$_{\nu\mu}$ in 855. Retransmission of the packet then takes place on channel $\nu$-$\mu$ wherein the second node $\nu$ will use the same transmission resource, $PRB_\nu$ as in the preceding transmission.

If $R > I_{inst}^{\nu\mu}$, the channel $\nu$-$\mu$ is in an outage state and the first node $\mu$ signals this by means of the information OUTAGE$_{\nu\mu}$ in 860. Retransmission of the packet does then take place on channel $\nu$-$\mu$ wherein the second node $\nu$ will use a transmission resource, $PRB'_\nu$ which is different from the one used in the preceding transmission, $PRB_\nu$.

According to an alternative embodiment of the general mode, instead of allocating a new transmission resource to node $\nu$, provision could be made for using during retransmission in 860 a modulation and coding scheme of modulation with lower spectral efficiency than in the preceding transmission of the packet.

The invention claimed is:

1. A method of forwarding in a cooperative network, comprising a plurality of nodes including a source terminal, a destination terminal, and at least one relay terminal, a data packet being transmitted by the source terminal to the destination terminal via at least said relay terminal, the method comprising:

determining whether the data packet can be decoded without errors by the destination terminal and, if not, a determination is made whether at least one transmission channel routing said packet between at least one node, which is one of the source terminal and the relay terminal, and said destination terminal is in an outage state, the outage state occurring when a bit rate (R) on a channel is higher than the instantaneous mutual information (I) on the channel, and that:

when said channel is in an outage state, said node, which originally transmitted the packet over the at least one transmission channel, retransmits the packet using a different transmission resource or a modulation and coding scheme with lower spectral efficiency than the one used by this node in the preceding transmission of said packet; and when said channel is not in an outage state, said node, which originally transmitted the packet over the at least one transmission channel, retransmits the packet using the same transmission resource as the one used by the same node in the preceding transmission of said packet.

2. The forwarding method according to claim 1, wherein the node being the source terminal, and said relay terminal using an AF (amplify and forward) protocol, a determination is made whether the destination terminal can decode the data packet without errors, and if not, a determination is made whether the transmission channel between the source terminal and the destination terminal, relayed by the relay terminal is in an outage state and, when said channel is in an outage state, the source and relay terminals use for the new transmission of said packet on the relayed channel, different transmission resources, or modulation and coding schemes different from those used for the preceding transmission of said packet on this channel; and when said channel is not in an outage state, the source and relay terminals use for the new transmission of said packet on the relayed channel, the same transmission resources as those used for the preceding transmission of said packet on this channel.

3. The forwarding method according to claim 1, wherein the node being the source terminal, and said relay terminal using an AF (amplify and forward) protocol, a determination is made whether the destination terminal can decode the data packet without errors, and if not, a determination is made whether the transmission channel between the source terminal and the destination terminal, relayed by the relay terminal is in an outage state, and in case of outage of the relayed channel (s-r-d), a verification is made by means of partial demodulation of the data received by the relay terminal if the transmission channel (s-r) between the source terminal and the relay terminal is in turn in an outage state, and when the relayed channel (s-r-d) is not in an outage state, the source and relay terminals will use for retransmission of said packet on the relayed channel the same transmission resources ($PRB_1, PRB_2$) as those used for the preceding transmission of said packet on this channel;

when the relayed channel (s-r-d) is in an outage state, but that the channel (s-r) between the source terminal and the relay terminal is not, the source terminal will use the same transmission resource ($PRB_1$) as the one used for transmission of said packet on channel (s-r) between the source terminal and the relay terminal in the preceding transmission, and the relay terminal will use a transmission resource different ($PRB'_2$) from the one ($PRB_2$) used for the transmission of said packet on channel (r-d) between the relay terminal and the destination terminal in the preceding transmission;

when the relayed channel (s-r-d) is in an outage state and the channel (s-r) between the source terminal and the relay terminal is also out, the source terminal will use a transmission resource ($PRB'_1$) different from the one ($PRB_1$) used for the transmission of said packet on channel (s-r) between the source terminal and the relay terminal in the preceding transmission, and the relay terminal will use the same transmission resource ($PRB_2$) as the one used for the transmission of said packet on the channel (r-d) between the relay terminal and the destination terminal in the preceding transmission ($PRB_2$).

4. The forwarding method according to claim 1, wherein the node being the relay terminal, and said relay terminal using a DF (decode and forward) protocol, a determination is made whether the destination terminal can decode the data packet without errors, and if not, a determination is made whether the transmission channel (r-d) between the relay terminal and the destination terminal is in an outage state, and, when the transmission channel is in an outage state, the relay terminal will use a transmission resource ($PRB'_2$) different from the one ($PRB_2$) used for the transmission of said packet on channel (r-d) between the relay terminal and the destination terminal in the preceding transmission, when the transmission channel is not in an outage state, the relay terminal will use the same transmission resource ($PRB_2$) used for the transmission of said packet on channel (r-d) between the relay terminal and the destination terminal in the preceding transmission.

5. The forwarding method according to claim 4, wherein prior to the transmission of said packet by the relay terminal, a determination is made whether the relay terminal can decode the data packet without errors, and, if not, a determination is made whether the transmission channel (s-r) between the source terminal and the relay terminal is in an outage state and, when the transmission channel between the source terminal and the relay terminal is in an outage state, the source terminal will use a transmission resource different ($PRB'_1$) from the one ($PRB_1$) used for the transmission of said packet on the channel (s-r) between the source terminal and the relay terminal in the preceding transmission, and when the transmission channel between the source terminal and the relay terminal is not in an outage state, the source terminal will use the same transmission resource ($PRB_1$) used for the transmission of said packet on the channel (s-r) between the source terminal and the relay terminal in the preceding transmission.

6. The forwarding method according to claim 1, wherein the source terminal transmits on the one hand said packet on a direct channel (s-d) and on the other hand on a relayed channel (s-r-d) to the destination terminal, the relay terminal operating according to a DF (decode and forward) protocol and using the same code or a code different therefrom used by the source terminal for coding the packet prior to transmission thereof.

7. The forwarding method according to claim 6, the node is the relay terminal, a determination is made whether the destination terminal can decode without errors the packet received on the relayed channel, and, if not, a determination is made whether the transmission channel (r-d) between the relay terminal and the destination terminal is in an outage state, and, when the transmission channel between the relay terminal and the destination terminal is in an outage state, the relay terminal retransmits said packet on a transmission resource ($PRB'_2$) different from the one ($PRB_2$) used for the transmission of said packet on the channel (r-d) between the relay terminal and the destination terminal in the preceding transmission, when the transmission channel between the relay terminal and the destination terminal is not in an outage state, the relay terminal retransmits said packet on the same transmission resource ($PRB_2$) used for the transmission of said packet on the channel (r-d) between the relay terminal and the destination terminal in the preceding transmission.

8. The forwarding method according to claim 7, wherein before determining whether the destination terminal can decode without errors the packet received on the relayed channel, a determination is made whether the destination terminal can decode without errors the packet received on the direct channel, and, if not, a determination is made whether the relay terminal can then decode the packet without errors, and, if this is still not the case, a verification is made whether at least the direct channel (s-d) and the channel (s-r) between the source terminal and the relay terminal are in an outage state, and in case of outage of either of the channels, the source terminal retransmits said packet on the direct and relayed channels, using a transmission resource different ($PRB'_1$) from the one ($PRB_1$) used for the preceding transmission of said packet, when there is no outage of these two channels, the source terminal retransmits said packet on the direct and relayed channels, using the same transmission resource ($PRB_1$) used for the preceding transmission of said packet.

9. The forwarding method according to claim 7, wherein when decoding of said packet is incorrect at the destination terminal but error-free at the relay terminal, the instantaneous mutual information ($I_{inst}^{rd}$) on the channel (r-d) between the relay terminal and the destination terminal, and that ($I_{inst}^{sd}$) on the direct channel (s-d) are compared, and when the instantaneous mutual information ($I_{inst}^{rd}$) on the channel (r-d) between the relay terminal and the destination terminal is greater than the instantaneous mutual information ($I_{inst}^{sd}$) on the direct channel (s-d): the relay terminal transmits said packet to the destination terminal;

when the instantaneous mutual information ($I_{inst}^{sd}$) on the direct channel (s-d) is greater than the instantaneous mutual information ($I_{inst}^{rd}$) on the channel (r-d) between the relay terminal and the destination terminal:

a verification is made if at least the direct channel (s-d) or the channel (s-r) between the source terminal and the relay terminal is in an outage state, and in case of outage of either of the channels, the source terminal retransmits said packet on the direct and relayed channels, using a transmission resource different ($PRB'_1$) from the one ($PRB_1$) used for the preceding transmission of said packet, when these two channels are not out, the source terminal retransmits said packet on the direct and relayed channels, using the same transmission resource ($PRB_1$) used for the preceding transmission of said packet.

10. The forwarding method according to claim 1, wherein the source terminal transmits on the one hand said packet on a direct channel (s-d) and on the other hand on a relayed channel (s-r-d) to the destination terminal, the relay terminal using a code different from the one used by the source terminal for coding the packet prior to transmission thereof, the destination terminal making a combination of the data received via the direct channel and via the relayed channel.

11. The forwarding method according to claim 10, wherein said combination is done by concatenating the data received via the direct channel and that received via the relayed channel.

12. The forwarding method according to claim 1, wherein the source terminal transmits on the one hand said packet on a direct channel (s-d) and on the other hand on a relayed channel (s-r-d) to the destination terminal, the relay terminal using the same code as the one used by the source terminal for coding the packet prior to transmission thereof, the destination terminal making a combination of the data received via the direct channel and via the relayed channel.

13. The forwarding method according to claim 12, wherein said combination is done by summation of the soft values of the data received via the direct channel and the soft values of the data received via the relayed channel.

14. The forwarding method according to claim 10, 11, 12, or 13, wherein the destination terminal performs decoding of said packet using the packet code received from the source terminal, on the one hand, and the packet received from the relay terminal, on the other hand and, in case said packet cannot be decoded without errors, a determination is made whether the composite channel (sd & rd) resulting from the combination of the direct channel (s-d) and the channel between the relay terminal and the destination terminal (r-d) is in an outage state, and when said composite channel is not out, the source terminal retransmits said packet on the direct and relayed channels, using the same transmission resource ($PRB_1$) used for the preceding transmission of said packet, and the relay terminal forwards said packet on the same transmission resource ($PRB_2$) used for the preceding transmission;

in case of outage of the composite channel, the instantaneous mutual information ($I_{inst}^{rd}$) on the channel (r-d) between the relay terminal and the destination terminal and that ($I_{inst}^{sd}$) on the direct channel (s-d) are compared, and when the instantaneous mutual information ($I_{inst}^{rd}$) on the channel (r-d) between the relay terminal and the destination terminal is greater than the instantaneous mutual information ($I_{inst}^{sd}$) on the direct channel (s-d): the source terminal retransmits said packet using a transmission resource different ($PRB'_1$) from the one ($PRB_1$) used for the preceding transmission of said packet, when the instantaneous mutual information ($I_{inst}^{sd}$) on the direct channel (s-d) is greater than the instantaneous mutual information ($I_{inst}^{rd}$) on the channel (r-d) between the relay terminal and the destination terminal: the relay terminal retransmits said packet using a transmission resource ($PRB'_2$) different from the one ($PRB_2$) used for the preceding transmission of said packet.

15. The forwarding method according to claim 1, wherein the cooperative network is an OFDMA telecommunication system and the transmission resources are subcarrier intervals of an OFDM multiplex or pluralities of the intervals.

16. The forwarding method according to claim 1, wherein the at least one transmission channel is a block fading channel having fading instances, the instantaneous mutual information of the channel being calculated as the mutual information on a fading instance of the channel.

17. The forwarding method according to claim 16, wherein the at least one transmission channel is an OFDM channel using an OFDM multiplex and where the fading instances are frequency chunks of the OFDM multiplex.

* * * * *